United States Patent [19]
Kuchenbrod

[11] Patent Number: 5,853,150
[45] Date of Patent: Dec. 29, 1998

[54] AIRCRAFT LOADING AND UNLOADING SYSTEM

[75] Inventor: Gary W. Kuchenbrod, Pesotum, Ill.

[73] Assignee: Flight-X Products Corporation, Savoy, Ill.

[21] Appl. No.: 657,320

[22] Filed: Jun. 3, 1996

[51] Int. Cl.[6] .................................................. B64D 9/00
[52] U.S. Cl. ........................ 244/137.2; 14/71.5; 414/558; 212/168
[58] Field of Search .............................. 244/137.1, 137.2; 14/71.5; 414/558, 548; 16/368; 212/168

[56] References Cited

U.S. PATENT DOCUMENTS

| | | | |
|---|---|---|---|
| 561,822 | 6/1896 | Shadbolt | 414/558 |
| 2,721,353 | 10/1955 | Macintosh | 16/368 |
| 2,771,042 | 11/1956 | Deaton | 16/366 |
| 3,429,464 | 2/1969 | Robinson | 414/558 |
| 3,538,528 | 11/1970 | Porter et al. | 14/71.5 |
| 4,534,079 | 8/1985 | Tucker | 16/366 |

FOREIGN PATENT DOCUMENTS 565393  10/1993  European Pat. Off. ............... 414/558

*Primary Examiner*—Galen L. Barefoot
*Attorney, Agent, or Firm*—Knechtel, Demeur & Samlan

[57] ABSTRACT

A system for conversion of existing boarding bridges which are adapted for large aircraft for additional and/or alternating use with small aircraft. The invention is useful for allowing passengers to enplane and deplane between an airport terminal and either type of aircraft without leaving a protected environment.

11 Claims, 4 Drawing Sheets

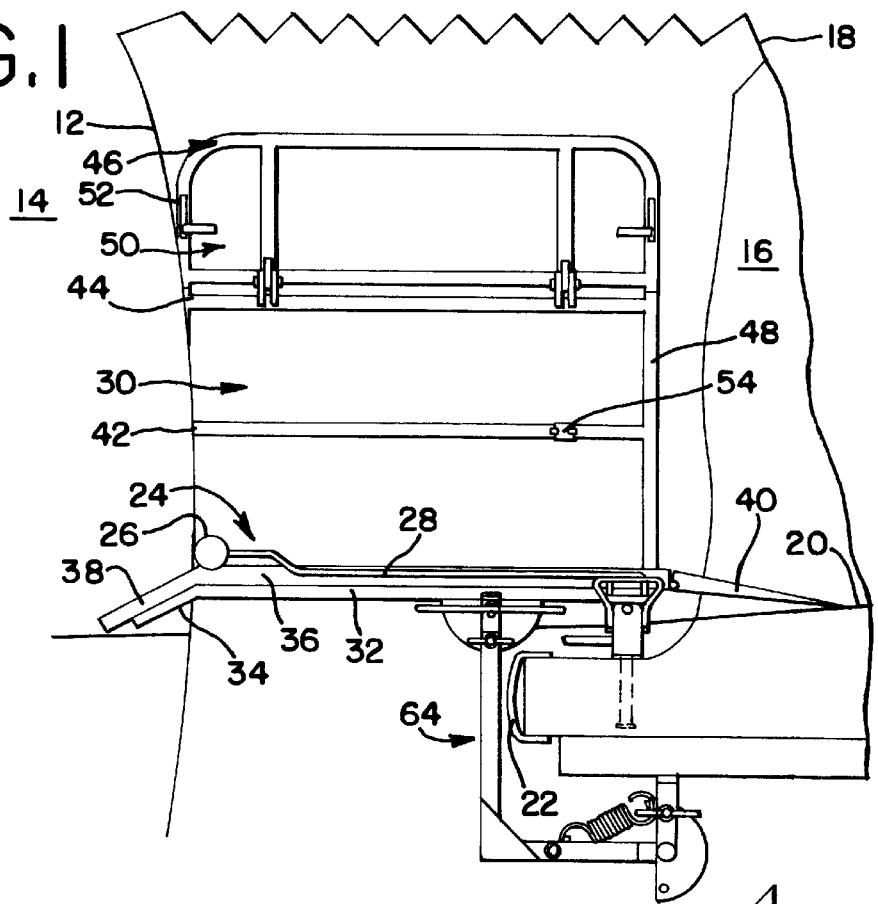
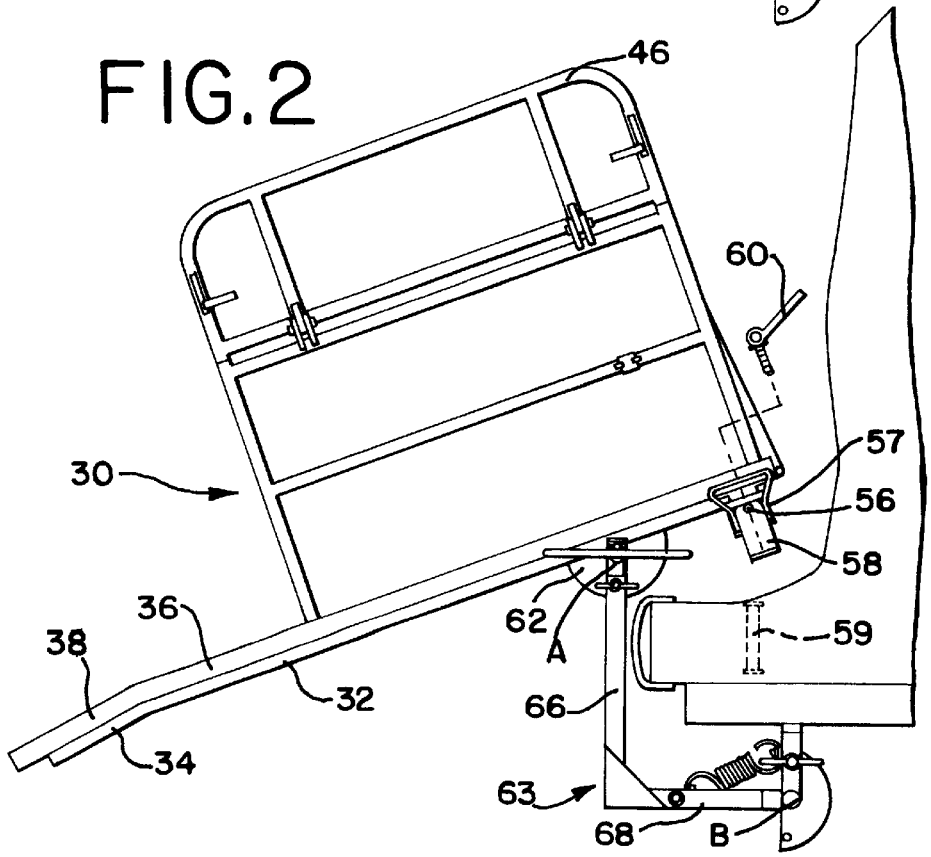

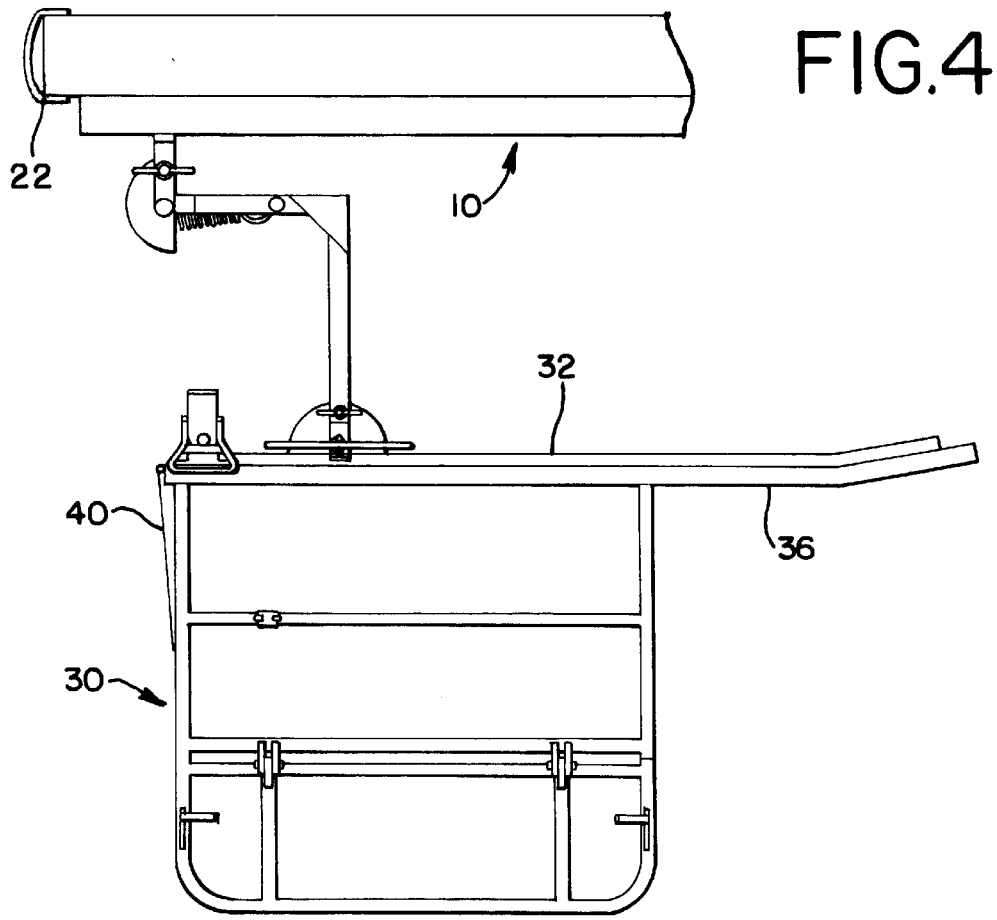
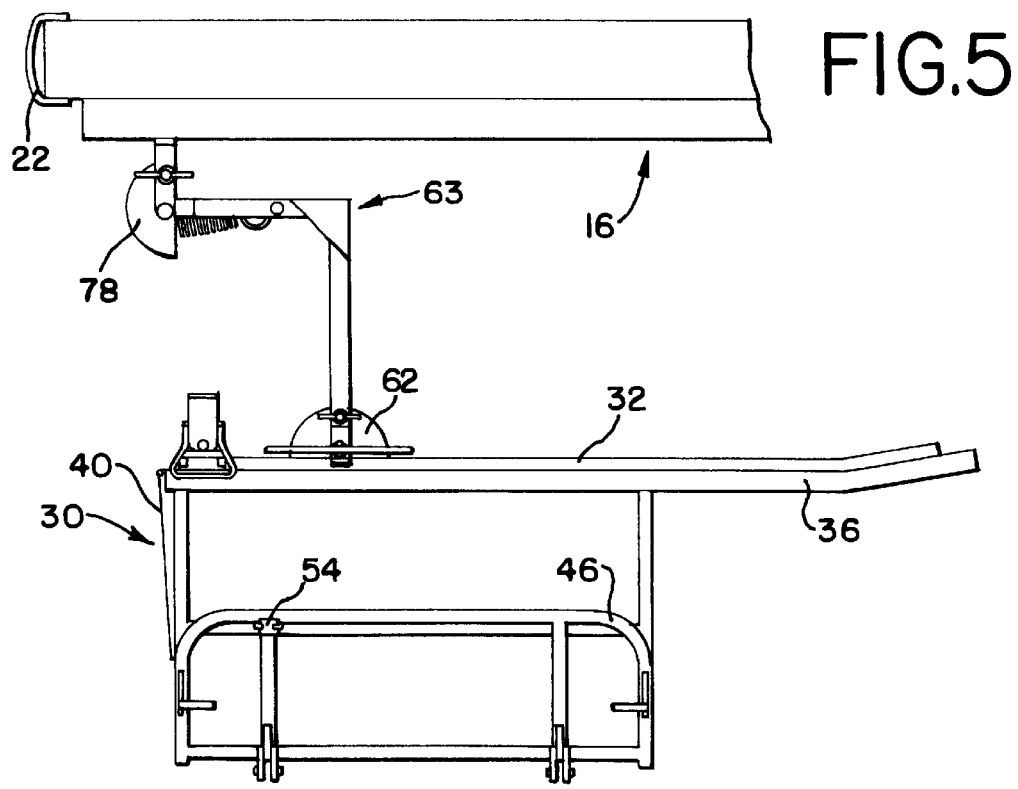

AIRCRAFT LOADING AND UNLOADING SYSTEM

BACKGROUND OF THE INVENTION

This invention relates to a method and apparatus to provide access by airplane passengers between an aircraft and the aviation terminal.

For many years a system of enclosed, elevated boarding bridges has been used at airports to provide sheltered access ways between waiting areas within a terminal and the doorways of large commercial jet aircraft cabins for purposes of convenient passenger loading and off-loading. Such boarding bridges are customarily constructed with two or more motorized sections pivotable relative to one another and are designed to extend out from the aviation terminal to a waiting aircraft.

The height of boarding bridges from the tarmac is adjustable to a degree which will accommodate a range of aircraft sizes, but these are mostly larger aircraft, the doors to which are 10 feet or more above the ground. Accordion type protective canopies are usually attached to the outer end of the boarding bridge and are designed to fit flush against the side of the aircraft when the walkway of the boarding bridge is aligned with the door sill of the aircraft cabin entrance, so that enplaning and deplaning passengers may step between the aircraft and the boarding bridge without having to cross a gap of open space or be exposed to the elements.

The aircraft customarily utilized in regional commuter service and general aviation are smaller than commercial jet aircraft. Their door openings are closer to the tarmac and the doors are designed to include their own stairs and hand rails. The doors open outwardly and pivot downwardly from the aircraft toward the tarmac to place the stairs in position for passengers to use them. Entry to and exit from aircraft using stairs are extraordinarily difficult tasks for many physically challenged persons and those in wheelchairs. The size of commuter and general aviation aircraft and the height and configuration of their exit doors and stairs make them incompatible with the use of existing boarding bridges.

In the first place, deployment of the cabin door with its self-contained stairs and rails blocks the approach of the boarding bridges currently in use. In addition, many such bridges cannot be lowered to a level which would allow access to the entry openings of these smaller aircraft. Without a method to allow passengers to board or deplane using existing boarding bridges, small aircraft must enplane or deplane passengers directly between the aircraft and the ground, thus exposing passengers to the hazards of weather, engine noise and traffic in the terminal area.

Because any use of boarding bridges by small aircraft must also be compatible with use by larger commercial aircraft, any method or apparatus used to service the smaller aircraft must be designed not to interfere with use of the same boarding bridge by larger commercial aircraft. Therefore, a means must be provided by which any equipment which adapts the boarding bridge to commuter aircraft use can be removed from the boarding bridge and stored when not in use and replaced when its use is needed.

SUMMARY OF THE INVENTION

A bridge extension for an aircraft boarding bridge is disclosed which is engageable with the end of a boarding bridge and the entryway of a small aircraft. A method and apparatus are disclosed which permit the bridge extension to be removed from the end of the boarding bridge and stowed on the boarding bridge structure in a position where it will not interfere with engagement of the boarding bridge and the entryway of a larger aircraft but yet may be easily restored to its original position for use with a small aircraft.

DESCRIPTION OF DRAWINGS

FIG. 1 is a side view of apparatus embodying the invention showing the bridge extension engaged with the entryway of a small aircraft and with the walkway of a boarding bridge.

FIG. 2 is a side view of the apparatus in an early stage of operation after the aircraft has been removed and the bridge extension is disengaged from the walkway of the loading bridge.

FIG. 4 is a side view of the apparatus when the bridge extension is fully pivoted to be beneath the boarding bridge.

FIG. 5 is another view of the bridge extension in its stowed position showing the hand rails folded to provide greater ground clearance.

DESCRIPTION OF THE INVENTION

Figure 3:
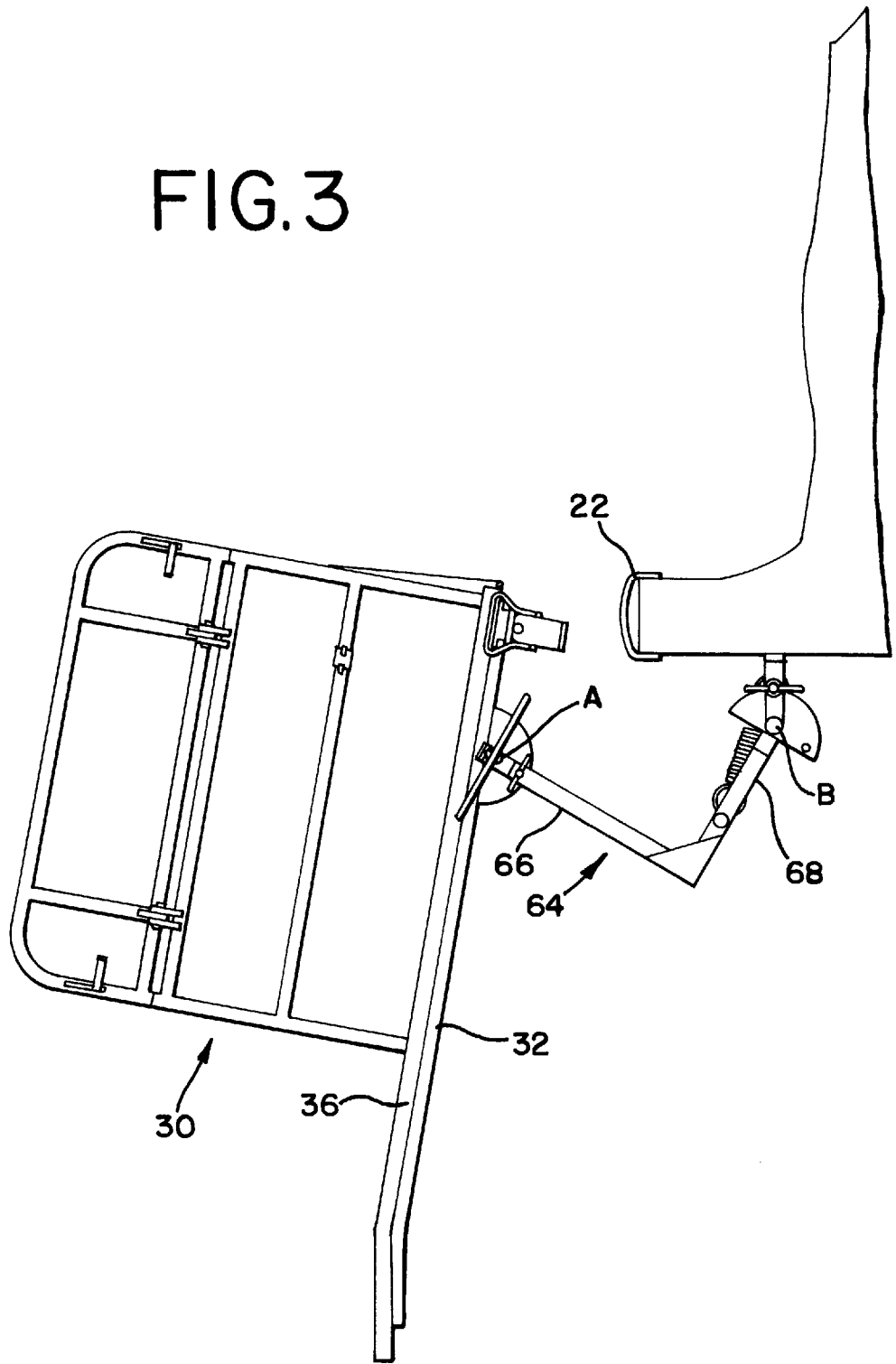
FIG. 3 is a side view of the apparatus at a later stage of operation showing the pivoting of the bridge extension almost to a vertical position.

Generally the invention includes two main components. The first main component is a bridge extension to provide a walkway between the end of the boarding bridge and the aircraft and to accommodate any differences in elevation between the boarding bridge walkway and the aircraft cabin floor. A framework of hand rails and restraining barrier for passenger safety is also included. This framework is collapsible for storage when not in use.

The second main component is a stowing apparatus which is permanently attached to the boarding bridge and mechanically linked to the extension bridge. This mechanism allows the extension bridge to be removed from engagement with the walkway of the boarding bridge and to be pivoted and rotated for storage under the boarding bridge when the boarding bridge is to be used with a larger aircraft. The movement is reversed for use with a smaller aircraft.

In FIG. 1 may be seen the outer skin 12 of a small aircraft 14 and an outer end of a boarding bridge 16—the end which is remote from the terminal. The reference numeral 18 designates the conventional accordion style canopy which engages the aircraft skin 12 to protect passengers from the elements. The boarding bridge has an interior floor or walkway 20. The boarding bridge may have more than one section, the sections being pivotable relative to one another about vertical axes (not shown). This permits the boarding bridge to extend so the outer end can approach the aircraft.

The boarding bridge includes a resilient bumper 22 which engages the fuselage of a larger aircraft signalling the operator of the bridge to stop movement of the boarding bridge toward the aircraft. For use with a smaller aircraft, a probe 24 is provided. As shown, the probe 24 includes a neoprene coated sphere 26 on the end of a shaft 28 extending outwardly from the end of the boarding bridge. The shaft includes a central section to provide a spring action when the sphere contacts the fuselage of a small aircraft, thus protecting the aircraft fuselage when contact is made. Contact of the probe with the aircraft fuselage is observed by the boarding bridge operator and is a signal to stop movement of the boarding bridge.

As shown in FIG. 1, an extension bridge 30 extends between the end of the boarding bridge 16 and into the cabin of the aircraft 14. The length of probe 24 is correlated with the length of the extension bridge to establish the proper engagement.

In the preferred embodiment which is shown in FIGS. 1–5, the extension bridge comprises an elongated generally flat base 32. In operation with a small aircraft, the base 32 extends between the end of the boarding bridge and the interior of the aircraft cabin. The base 32 is provided with an end section 34 angled slightly downward to partly or wholly accommodate the difference in height between the floor of the aircraft cabin and the bottom sill of the aircraft door frame. Overlying the base 32 is a walkway 36. The walkway 36 similarly has a downwardly angled section 38. Optionally the walkway may be movable relative to the base to accommodate minor differences in the distance between the end of the boarding bridge and the aircraft and between the cabin floor and door sill of the aircraft.

As shown in FIG. 1, the floor 20 of the boarding bridge is slightly above the floor of the aircraft cabin. The base 32 is shown as being horizontal. Often the base will be slanted slightly downward toward the aircraft, further increasing the utility of the angled sections 34 and 38.

Depending on the relative dimensions of parts of the boarding bridge and the extension bridge, there may be a height gap between the walkway 36 of the extension bridge and the floor 20 of the loading bridge. This is compensated for by ramp 40 which is hinged at the end of base 32 and movable between the engaged position shown in FIG. 1 and the retracted position shown in FIG. 2.

The extension bridge is also provided with horizontal guard rails 42 and 44 and hand rails 46, spaced from and attached to the base 32 by vertical members 48. The hand rails as illustrated are part of hand rail assemblies 50 which are pivotable outwardly with respect to upper guard rails 44 and lockable by first locking means 52 above the upper guard rails and by second locking means 54 below the upper guard rails. This portion of the apparatus contributes to safety of the passengers as they traverse the extension and also provides a more compact configuration for the extension bridge when it is stowed away, as will be described below in greater detail.

As shown in FIG. 2, two pillow style bearing blocks 57 are permanently attached to that end of the extension bridge which is to be attached to the boarding bridge 20. A horizontal shaft 56 passes through the two pillow style bearing blocks. The length of the shaft is greater than the width of the extension bridge, which allows some lateral traverse of the extension bridge along the shaft.

Each end of the horizontal shaft is fitted with an angle iron footpad 58. When the extension bridge is in use, the horizontal shaft is anchored to the boarding bridge by quick release pins 60 inserted through the angle iron footpads into the main floor support mount 59 of the boarding bridge. A semi-circular pivot plate 62 is attached below the extension bridge base and is removably attached to an under-bridge storage mechanism 63 to be described in detail below.

Attachment to the horizontal shaft allows the extension bridge to slide laterally in order to accommodate accurate alignment with the aircraft door. The pivotal attachment to the shaft allows the outer end of the extension bridge to be raised and lowered drawbridge fashion within a range of movement which allows easier insertion and accommodates any difference between the height of the boarding bridge and the aircraft cabin entryway.

The extension bridge is necessarily narrower than the boarding bridge walkway since it must be mounted to the boarding bridge within the boarding bridge side walls and the protective canopy. The inconvenience is not great for small aircraft since their doors are also small. The extension bridge may even be used with larger aircraft. But in such use the inconvenience is far more perceptible, particularly to passengers with bulky carry-on luggage. The extension bridge provides benefits for small aircraft which are not needed for large aircraft and indeed it is a detriment to rapid loading and unloading and passenger comfort when used with large aircraft.

Figure 6:
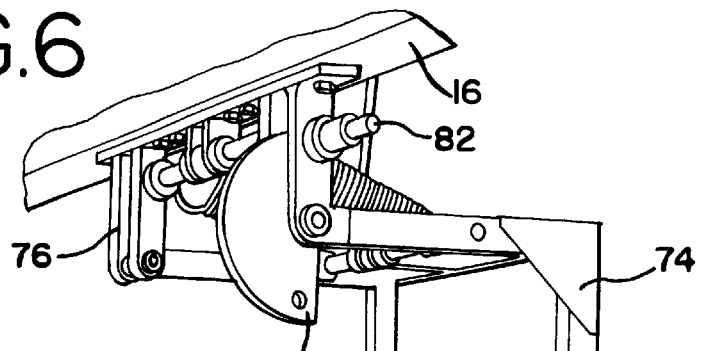
FIG. 6 is a perspective view of the mechanism for moving, stowing and remounting the bridge extension.
Figure 7:
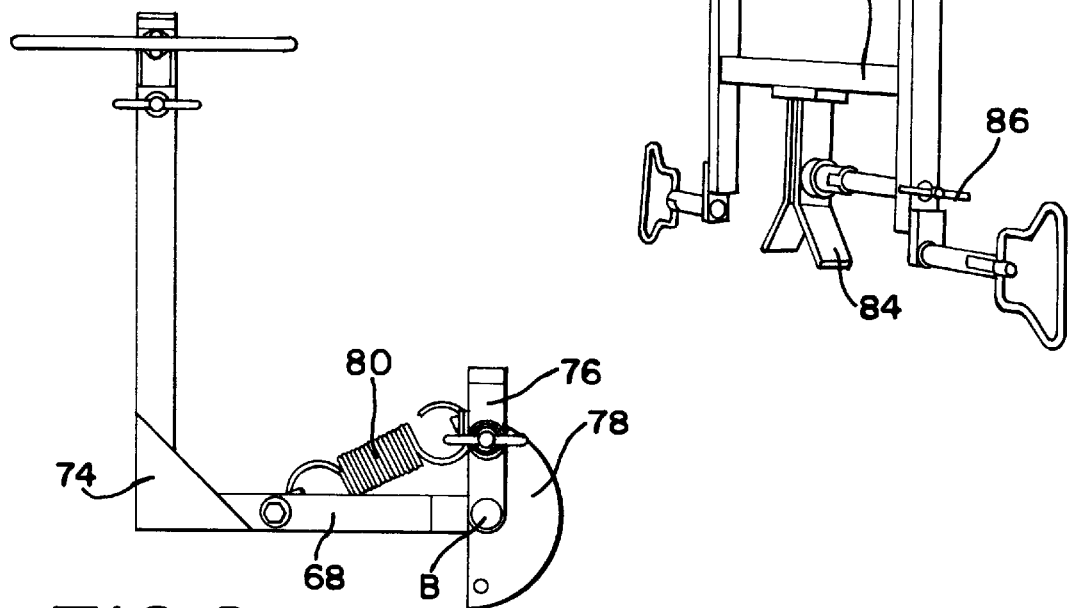
FIG. 7 is a side view of a portion of the mechanism shown in FIG. 6.
Figure 8:
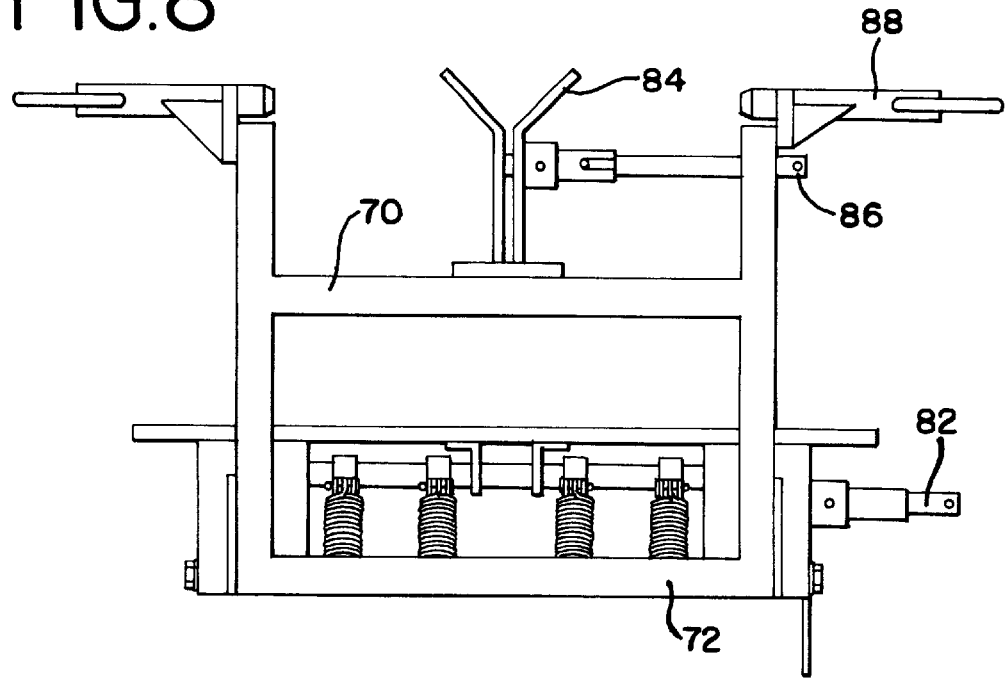
FIG. 8 is an end view of the mechanism shown in FIG. 7.

Therefore, applicant has provided a method and apparatus for removing the extension bridge from the end of the boarding bridge walkway and pivoting and rotating it to a storage position under the boarding bridge where it will not interfere with use of the boarding bridge alone with a larger aircraft. The sequence of operations is shown in FIGS. 1–5. Viewing these Figures in reverse order shows the sequence for remounting the extension bridge for appropriate use with a small aircraft. FIGS. 6–8 show more detailed views of the stowing apparatus without the extension bridge, for greater clarity.

The movements of the loading bridge to be described are accomplished by conventional motors and power transmissions and need not be described in order to understand the invention. The movements of the extension bridge are disclosed in detail with no reference to the motive power. At present, it appears that human labor is the most cost effective, although motors could be provided.

As previously noted, FIG. 1 shows the extension bridge engaged with the entryway of an aircraft. When all passengers have deplaned and all new passengers have enplaned, the extension bridge is rotated clockwise from its position as viewed in FIG. 1 around shaft 56 sufficiently that the base 32 and walkway 36 and their angled sections 34 and 38 have been raised and stowed in a vertical position on the boarding bridge 20. The motorized boarding bridge is then backed away from the aircraft so that there is clearance for closing the aircraft door and for the aircraft to taxi away.

Raising the extension bridge to its vertical position on the boarding bridge requires that the under-bridge stowing mechanism 63 be engageable with and disengageable from the extension bridge. To provide this advantage, the extension bridge is provided with a semi-circular pivot plate 62. The stowing mechanism 63 generally includes L shaped angle pieces 64 which each have a long arm 66 and a short arm 68. Movable pivot A is on one end of the long arms 66. The remote end of short arms 68 pivot around fixed pivot B which is on the underside of the boarding bridge. Strut 70 joins long arms 66. The pivot plate 62 mates with a yoke 84 shown in FIGS. 6 and 8 on strut 70. Both the plate and yoke are provided with holes which, when in register with one another, permit entry of a pin connector 86 mounted on one of long arms 66 to provide engagement of the extension bridge and the stowage mechanism. Further engagement is provided by spring loaded pin connectors 88 shown in FIG. 8 which engage pin blocks on the extension bridge.

While the extension bridge is either in use or stowed in a vertical position on the boarding bridge, the stowing apparatus is normally in the retracted position shown in FIG. 6. If the loading bridge 20 is needed for use with a larger aircraft, the extension bridge is attached to the stowing apparatus and then removed from the loading bridge.

Disengagement of the extension bridge from the boarding bridge first requires a mechanical connection to the long arms 66 of the angle pieces 64. The angle pieces 64 are pivoted 180 degrees from their position in FIG. 6 to the position shown in FIG. 1 so that the long arms 66 are vertical. The long arms are provided with spring loaded pin connectors 88 shown in FIG. 8 which engage pin blocks 90 on the extension bridge FIG. 1.

The extension bridge is then released from the boarding bridge by removal of quick release pins 60. The extension bridge then pivots on the pin connectors 88 at pivot point A and may be locked into the 30 degree position shown in FIG. 2. This locking is accomplished by insertion of pin 66 into a pre-set hole in pivot plate 62. This locking into a tilted position is necessary to allow the extension bridge assembly to clear the boarding bridge when the angle piece 64 begins its rotation downward through the positions shown in FIGS. 2–4.

The downward rotation into the stowed position occurs around pivot point B shown in FIGS. 2 and 3. A detailed description of the structure of pivot point B appears hereafter.

As shown in FIG. 3, the downward rotation of the angle piece 64 is at about 50 degrees. Owing to its initial 30 degree tilt, the total rotation of the extension bridge as shown in FIG. 3 is about 80 degrees, and the base 32 and walkway are approaching a vertical position. Simultaneously, due to the configuration of angle piece 64, the extension bridge has moved outwardly so that the extension bridge 30 has cleared bumper 22.

In FIG. 4, angle pieces 64 have rotated 180° around fixed pivot B. The rotation of extension bridge 30 around movable pivot A shown in FIG. 2 has been reversed so that the base and walkway of the extension bridge are horizontal. Now, however, the walkway of the extension bridge is below the loading bridge and the hand rails are below the walkway. This is the stowed position.

In FIG. 5, the hand rails 50 have been rotated 180° and locked by second locking means 54. This is to provide greater ground clearance under the extension bridge when it is in its stowed position. Clearly the hand rail position could have been changed at any time during the operation as may be most convenient. The entire sequence of movement is reversed to restore the extension bridge to its operative position.

As more clearly seen in FIGS. 6 and 8, angle pieces 64 are parallel to one another and joined by struts 70 and 72. The joints between the two arms 66 and 68 are strengthened by angle irons 74. Short arms 68 are pivotally attached to support members 76 and rigidly attached to pivot plate 78. The support members are bolted to the underside of the boarding bridge. Springs 80 bias the angle pieces 64 to the positions shown either in FIGS. 1 or 6. The pivot plate 78 is provided with holes to be engaged by a spring loaded automatic locking pin 82 attached to a support member to secure the angle piece 64 in either one of the positions shown in FIG. 1 or FIG. 5. When the connecting pins are disengaged, movement around fixed pivot B is possible.

Thus an aircraft loading and unloading system has been provided which is quickly adaptable for use with both large and small aircraft of different designs. Various other advantages and variations will be apparent to those skilled in the art without departing from the scope of the following claims.

What is claimed is:

1. A system for providing entry into an aircraft from a building provided with a boarding bridge engageable at one end thereof with said building and moveable at the other end thereof into proximity with an entrance into said aircraft, comprising:
    a. a platform attached to said other end of said boarding bridge;
    b. said platform being adapted to engage said entrance into said aircraft; and
    c. said platform being pivotally mounted on said boarding bridge for movement between an extended position for engaging said entrance of said aircraft and a storage position below said other end of said boarding bridge.

2. Apparatus according to claim 1 further comprising
    a. means for detaching said platform from said boarding bridge,
    b. means for supporting said platform after it is detached from said boarding bridge, and
    c. means for rotating said platform relative to said other end of said boarding bridge to a position below said boarding bridge,
    d. whereby said boarding bridge is permitted to directly engage said entrance into said aircraft.

3. Apparatus according to claim 2 wherein said platform is also rotatable to a position within said boarding bridge.

4. Apparatus according to claim 2 wherein said support means is rotatable to rotate said platform and simultaneously move said platform away from said other end of said boarding bridge.

5. Apparatus according to claim 4 wherein said support means comprises
    a. at least one arm removable from and attachable to said platform on a pivot which is movable relative to said loading bridge, and
    b. at least one arm pivotably linked to said loading bridge on a pivot which is fixed relative to said loading bridge.

6. A method for stowing an extension bridge attached to and used with a boarding bridge for entry into and exit from an aircraft so that one end of said boarding bridge may directly contact an aircraft, comprising:
    a. engaging said extension bridge with a support means linked to said one end of said boarding bridge, and
    b. rotating said extension bridge about said one end of said boarding bridge to a storage position below said one end to permit direct contact of said boarding bridge with said aircraft.

7. A method according to claim 6 further comprising detaching said extension bridge from said boarding bridge after engaging said extension bridge with said support means.

8. A method according to claim 6 further comprising moving said extension bridge outwardly from said one end of said boarding bridge while rotating said extension bridge.

9. A method according to claim 8 further comprising securing said extension bridge beneath said boarding bridge.

10. A method according to claim 9 further comprising folding portions of said extension bridge upwardly to provide increased ground clearance below said extension bridge when said extension bridge is secured beneath said boarding bridge.

11. A system for providing entry into an aircraft from a building provided with a boarding bridge engageable at one end thereof with said building moveable at the other end thereof into proximity with an entrance into said aircraft, comprising:

a platform attached to said other end of said boarding bridge;

said platform being adapted to engage said entrance into said aircraft;

said platform being pivotally mounted on said boarding bridge for movement between an extended position for engaging said entrance of said aircraft and a storage position below said boarding bridge;

means for rotating said platform relative to said other end of said boarding bridge to a position below said boarding bridge;

means for detaching said platform from said boarding bridge;

means for supporting said platform after it is detached from said boarding bridge wherein said support means further comprises:

at least one arm removable from an attachable to said platform on a pivot which is moveable relative to said loading bridge, and at least one arm pivotally linked to said loading bridge on a pivot which is fixed relative to said loading bridge.

* * * * *